United States Patent [19]
Salvio

[11] Patent Number: 5,798,879
[45] Date of Patent: Aug. 25, 1998

[54] STRESS-FREE, ADJUSTABLE OPTICAL SUPPORT

[76] Inventor: Paul R. Salvio, 30822 Rue de la Pierre, Palos Verdes Peninsula, Calif. 90274

[21] Appl. No.: 478,147

[22] Filed: Jun. 7, 1995

[51] Int. Cl.⁶ .............. G02B 5/08; G02B 7/182; H01J 3/14
[52] U.S. Cl. .......... 359/857; 359/861; 359/871; 250/216; 250/239; 248/478
[58] Field of Search ............... 359/857, 871, 359/872, 838, 819, 821, 861, 894, 847, 848, 849, 873; 248/478, 483; 250/208.1, 216, 239

[56] References Cited

U.S. PATENT DOCUMENTS

| | | | |
|---|---|---|---|
| 3,730,474 | 5/1973 | Bowers | 248/478 |
| 3,897,139 | 7/1975 | Caruolo et al. | |
| 3,979,866 | 9/1976 | Prescott | |
| 4,186,905 | 2/1980 | Brudy | 248/478 |
| 4,204,374 | 5/1980 | Olson | |
| 4,468,849 | 9/1984 | Anderson et al. | |
| 5,081,546 | 1/1992 | Bottrill | 248/478 |
| 5,110,196 | 5/1992 | Lang et al. | 248/483 |
| 5,120,015 | 6/1992 | Do Espirito Santo | 359/871 |

*Primary Examiner*—Ricky D. Shafer
*Attorney, Agent, or Firm*—Leonard A. Alkov; William C. Schubert; Glenn H. Lenzen, Jr.

[57] ABSTRACT

Three adjustable supports, positioned at the vertices of a triangle, are used to support one structure from another structure. In one form of the support, a post threaded at its lower end extends from the first structure to a slot in the second structure. A spring is captured between a shoulder on the post and a facing shoulder on the second shoulder at the bottom of the slot. A threaded end of the post extends through an oversize bore in the second structure. A spherical washer has a flat side resting against the outer surface of the second support, and a spherical washer is engaged to the threaded end of the post such that the spherical surface of the washer contacts the spherical surface of the nut to provide freedom of movement.

11 Claims, 2 Drawing Sheets

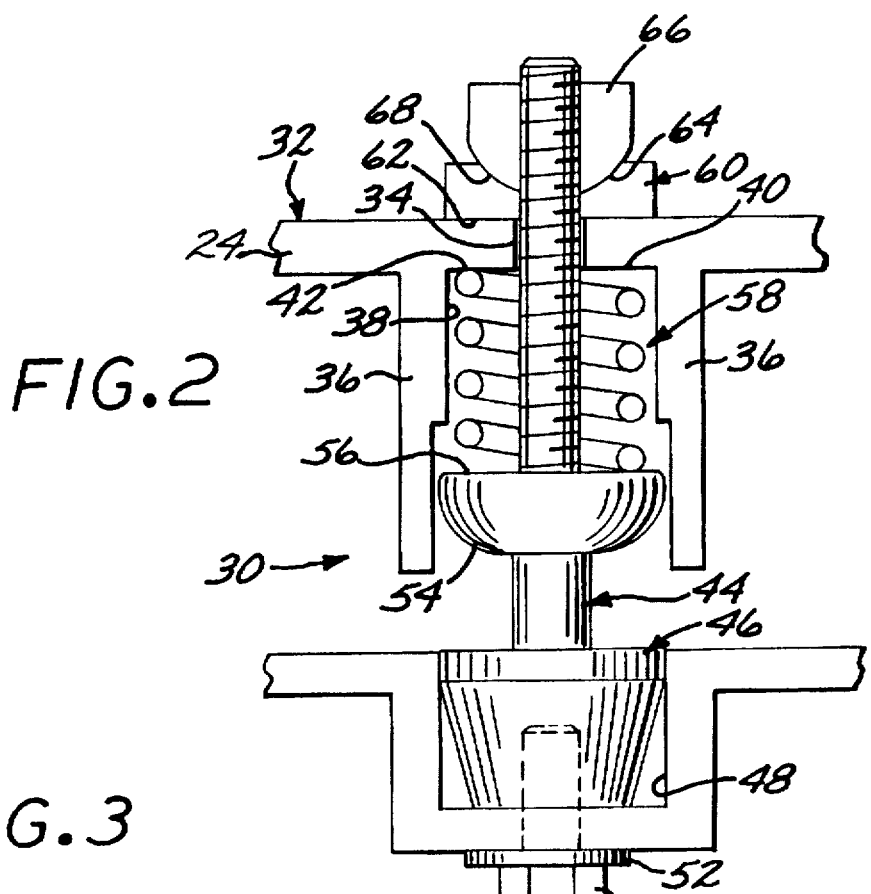
FIG.2
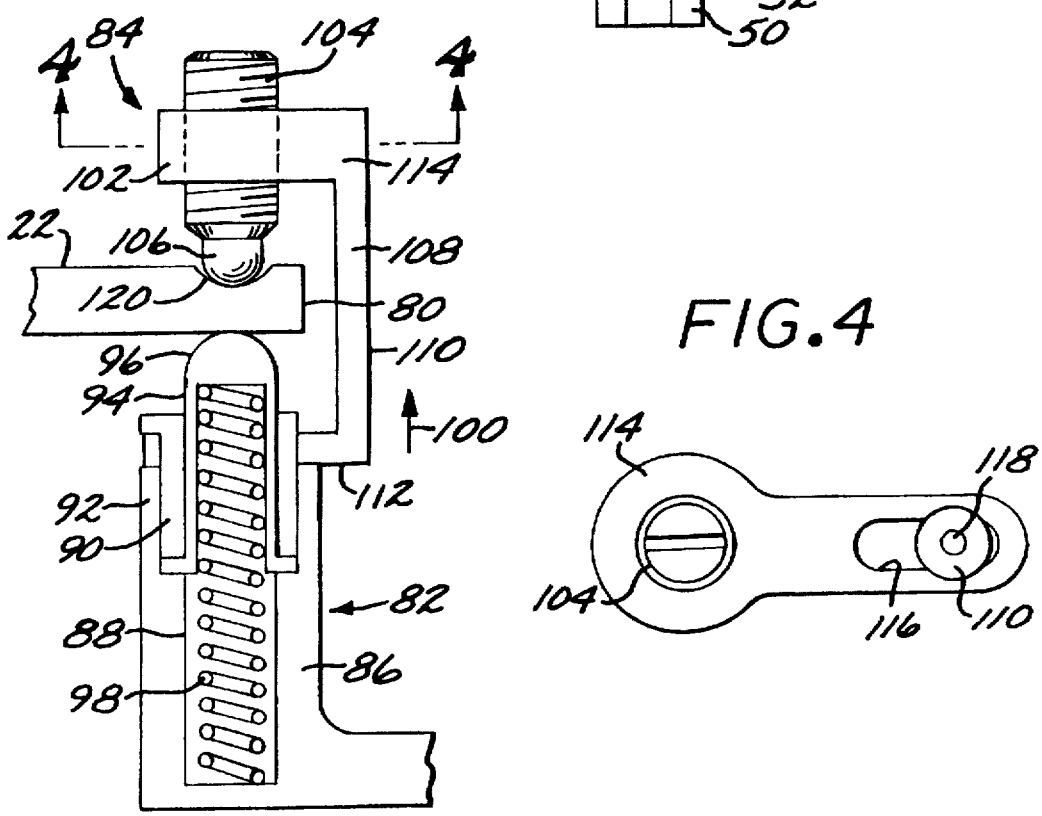
FIG.3
FIG.4

STRESS-FREE, ADJUSTABLE OPTICAL SUPPORT

BACKGROUND OF THE INVENTION

This invention relates to a support system for supporting a structure from a base, and, more particularly, for adjustably supporting an optics assembly from its base on triangularly arranged legs.

In assembling and aligning optical devices, it is often required to precisely support and position an optical assembly relative to a support base. The optical assembly must be carefully aligned with respect to another structure. The alignment must be maintained initially and through extended service in a variety of applications and sometimes-harsh environments. Vibrations, shocks, and temperature changes (working through the differences in coefficients of thermal expansion of the components) can all lead to loss of alignment during service.

While operable to various degrees, available mounting and aligning devices have various drawbacks. Some do not permit the required degree of careful adjustment of the optical assembly. Others are overly susceptible to shock and vibrational influences on the support. Temperature changes cause some of the supports to change the position of the optical assembly.

Thus, although mounting supports are known, there is a need for an improved approach for adjustably mounting optical assemblies and other types of precision devices. The present invention fulfills this need, and further provides related advantages.

SUMMARY OF THE INVENTION

The present invention provides a support and adjustment system useful for supporting structures. The system of the invention holds the supported structure securely in a manner that permits its precise adjustment and positioning, without the introduction of stresses and strains into the supported structure. The support and adjustment system is compliant to accommodate dimensional changes in the supported system arising from, for example, the difference in coefficients of thermal expansion of the components and supported structure. The ability to accommodate such dimensional changes is important when the supported structure is an optical assembly, the application of most interest to the inventor, and particularly important when the optical assembly is made in part of plastic optical elements.

In accordance with one embodiment of the invention, an apparatus a first structure and a second structure having an exterior surface and a second structure bore therethrough extending perpendicular to the exterior surface. The second structure bore has a second structure bore shoulder facing toward the first structure. The apparatus further includes means for supporting the first structure from the second structure, the means for supporting comprising a support, preferably three identical supports arranged on the vertices of a triangle. Each support includes a post attached to the first structure with a post shoulder facing the second structure and a threaded end extending through the second structure bore with a clearance between the post and the second structure bore. A coil spring overlies the post and is captured between the second structure bore shoulder and the post shoulder. A spherical washer overlies the post. The spherical washing has a flat surface contacting the exterior surface of the second structure, and a spherical surface oppositely disposed to the flat surface. A spherical nut is threaded onto the threaded end of the post with a spherical region of the spherical nut facing and contacting the spherical surface of the spherical washer. The position of the first structure relative to the second structure—both spacing and tilt, is determined by tightening or loosening the spherical nut on each of the supports. The support means compensates for thermal strains resulting from changes in temperature.

In accordance with another, but less preferred embodiment, an apparatus comprises a first structure, a second structure, and at least one support extending between the first structure and the second structure. Preferably, there are three supports, arranged at the vertices of a triangle. Each support comprises a first-side mounting head including a body having a bore therein, a plunger residing within the bore and having a rounded plunger tip extending out of the bore, and biasing means for biasing the plunger in a direction out of the bore. Each support further comprises a second-side mounting head including an adjusting ball nut having a rounded ball tip, and an arm extending between the first-side mounting head and the second-side mounting head. The second structure preferably has a recess in its surfaces positioned to receive the respective plunger tip or ball tip therein, which aids in maintaining the centered position of the second structure. The arm holds the plunger tip and the ball tip in a facing but spaced-apart relation. The arm preferably has a C-shape. One side of the C-shaped arm can be slotted to permit it to move relative to the central portion of the arm.

BRIEF DESCRIPTION OF THE DRAWINGS

FIG. 2 is a schematic sectional view of the first embodiment of the support;

FIG. 3 is a sectional view of a second embodiment of the support; and

FIG. 4 is a fragmented sectional view of the support of FIG. 3, taken on lines 4—4.

DETAILED DESCRIPTION OF THE INVENTION

Figure 1:
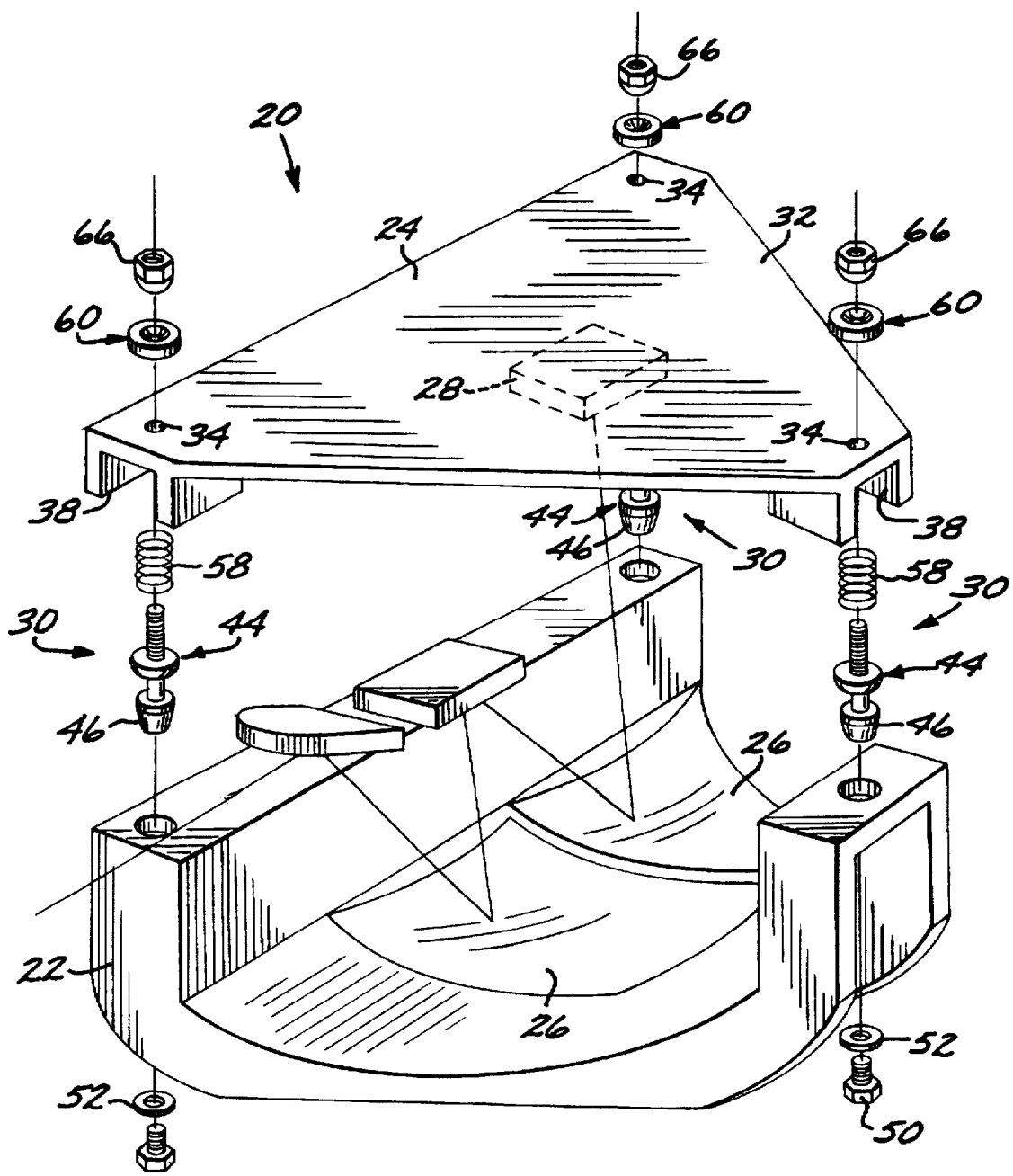
FIG. 1 is a perspective view of the apparatus of the invention using the first embodiment of the support, with the supports shown in exploded view.

FIG. 1 illustrates an apparatus 20 having a first structure 22 and a second structure 24. In a preferred embodiment, the apparatus 20 is an optical device, the first structure 22 is a generally planar optical assembly such as an optical imager having mirrors 26 supported thereon, and the second structure 24 is a housing that holds a focal plane array 28 thereon. The first structure 22 is supported from the second structure 24 by at least one support 30. Preferably, there are three supports 30 extending between the first structure 22 and the second structure 24, with the three supports 30 being arranged at the vertices of a triangle. In the preferred embodiment where the second structure 24 is generally planar in form, the three supports 30 are disposed to lie perpendicularly to the plane of the second structure 24.

In FIG. 1, the supports 30 are illustrated in their most preferred embodiment, in an exploded view that aids in understanding their assembly. FIG. 2 illustrates the preferred embodiment of the supports in a sectional view. The second structure 24 has an exterior surface 32 and a second structure bore 34 therethrough extending perpendicular to the exterior surface 32. Two parallel inwardly facing, spaced apart, slot walls 36 extending from the second structure 24 toward the first structure 22 define an inwardly facing slot 38. The bore 34 penetrates through a bottom 40 of the slot 38, such that the bottom 40 of the slot 38 acts as a second structure bore shoulder 42 facing toward the first structure 22.

A post 44 has a radially enlarged base 46 that is received in an inwardly facing recess 48 of the first structure 22. A retaining screw 50 extends through the first structure 22 into the end of the base 46 to hold the post 44 to the first structure, with a washer 52 between the head of the screw 50 and the first structure. The opposite end of the post 44 is threaded and is of sufficient length to extend through the bore 34 past the exterior surface 32.

The post 44 has a radial enlargement 54 thereon, with the radial enlargement 54 sized to fit within the slot 38. The side of the radial enlargement 54 facing the second structure 24 defines a post shoulder 56. A coil spring 58 overlies the post 44, and is captured between the post shoulder 56 and the second structure bore shoulder 42.

A spherical washer 60 overlies that portion of the post 44 which extends past the exterior surface 32 of the second structure 24. A flat surface 62 of the spherical washer 60 lies against the exterior surface 32, and a spherical surface 64 of the washer 60 is oppositely disposed and faces away from the exterior surface 32. A spherical nut 66 is threadably engaged to the threads on the post 44, with a spherical surface 68 of the spherical nut facing and contacting the spherical surface 64 of the spherical washer 60.

When the support 30 is assembled in the manner shown, misalignments and dimensional changes are accommodated by the combination of movement of the post 44 in the slot 38 and the pivoting action of the spherical surfaces 64 and 68. The position of the first structure 22 is adjusted with respect to the second structure 24 by tightening or loosening the spherical nuts on the three supports 30. The spacing and/or the tilt orientation of the first structure relative to the second structure is easily adjusted by the individual adjustments to the supports 30. The supports 30 remain tight against the structures 22 and 24 due to the preloading of the spring 58.

FIG. 3 illustrates another, but less preferred embodiment of the support 30, which is useful when an edge 80 of the first structure 22 is accessible and the support is to be positioned near to the edge. The support 30 of FIG. 3 includes a first-side mounting head 82 and a second-side mounting head 84.

The first-side mounting head 82 includes a body 86 that is attached to the second structure 24. The body 86 has a bore 88 therein. A bushing 90 is received within an upper end 92 of the bore 88. A hollow plunger 94 resides within the bore 88, and is free to slide within the bore 88. The plunger 94 is open at its lower end and has at its upper end a rounded plunger tip 96 that extends out of the bore 88. A coil spring 98 fits within the interior of the plunger 94, with its lower end reacting against the bottom of the bore 88 and its upper end reacting against the inside of the rounded plunger tip 96. The spring 98 biases the plunger 94 and plunger tip 96 in a bias direction 100.

The second-side mounting head 84 includes an internally threaded ball nut housing 102 and an adjustable, externally threaded ball nut assembly 104 that is threaded onto the internal threads of the ball nut housing 102. The ball nut assembly 104 includes a rounded ball tip 106 that faces toward, but is spaced apart from, the plunger tip 96. The position of the ball tip 106 is adjustable upwardly or downwardly by rotating the ball nut assembly 104 within the ball nut housing 102.

An arm 108 extends between the first-side mounting head 82 and the ball nut housing 102 of the second-side mounting head 84. The arm 108 is generally of a C-shape with a central portion 110, a first side portion 112, and a second side portion 114. This C-shape permits the arm to extend around the edge 80 of the first structure 22, so that the first-side mounting head 82 is on one side of the first structure 22, and the second-side mounting head 84 is on the other side of the first structure 22. The side portions 112 and 114 are dimensioned to hold the rounded plunger tip 96 and the rounded ball tip 106 in a facing but spaced-apart relationship.

The side portions 112 and 114 may be rigidly attached to the central portion 110. Alternatively, one of the side portions may be slidably attached to the central portion. FIG. 4 illustrates the latter case, where the second side portion 114 has a slot 116 through which a set screw 118 attaches the second side portion 114 to the central portion 110. This mode of attachment permits the second side portion 114 and thence the ball nut housing 102 and ball tip 106 to be positioned and to slide parallel to the slot 116 responsive to differential expansion.

At least one side of the first structure 22 preferably includes a recess 120 therein. The recess 120 is positioned and dimensioned to receive the ball tip 106 in the recess 120. The engagement between the ball tip 106 and the recess 120 serves to hold the first structure 22 in the support 30 securely and without the imposition of lateral stress.

In the operation of the support 30 of FIGS. 3 and 4, the first structure 22 is positioned and the ball nut assembly 104 is adjusted to contact the ball tip 106 to the first structure 22 in the recess 120. This same operation is performed for the all three supports 30. Further adjustment of the supports 30 is accomplished by rotating their respective ball nut assemblies 104 to change the position of the first structure 22 in the upward or downward directions, or to accomplish slight tilting of the first structure 22.

The present invention provides a stress-free approach to mounting two structures together in an adjustable manner. Differential thermal expansion is also accommodated. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An apparatus, comprising:

a first structure;

a second structure having an exterior surface and exactly three second structure bores therethrough extending perpendicular to the exterior surface, each second structure bore having a second structure bore shoulder facing toward the first structure; and means for supporting the first structure from the second structure, the means for supporting comprising exactly three supports, each support including a post attached to the first structure, the post having a post shoulder facing the second structure and a threaded end extending through the second structure bore with a clearance between the post and the second structure bore;

a coil spring overlying the post and captured between the second structure bore shoulder and the post shoulder;

a spherical washer overlying the post, the spherical washer having a flat surface contacting the exterior surface of the second structure, and a spherical surface oppositely disposed to the flat surface; and a spherical nut threaded onto the threaded end of the post with a spherical region of the spherical nut facing and contacting the spherical surface of the spherical washer.

2. The apparatus of claim 1, wherein the means for supporting further comprises:

two parallel inwardly facing, spaced apart, parallel slot walls on the second structure for each support, the slot walls defining an inwardly facing slot disposed such that the second structure bore shoulder forms a bottom of the slot and the post shoulder fits within the slot.

3. The apparatus of claim 1, wherein the second structure comprises a housing for holding an optical detector.

4. The apparatus of claim 1, wherein the first structure comprises optical elements for forming an image.

5. The apparatus of claim 1, wherein the three supports are positioned at the vertices of a triangle.

6. An optical devise for maintaining optical elements in alignment with an optical detector, comprising:

a first structure, and a second structure, one of either the first structure or the second structure being an optical imager for supporting optical elements for forming an image and the other of either the first structure or the second structure being a housing for holding an optical detector for detecting an image formed by the optical imager, the second structure having an exterior surface and a second structure bore therethrough extending perpendicular to the exterior surface, the second structure bore having a second structure bore shoulder facing toward the first structure; and a support for holding the optical imager and the housing together in an optically coupled relationship, the support including:

a post attached to the first structure, the post having a post shoulder facing the second structure and a threaded end extending through the second structure bore with a clearance between the post and the second structure bore;

a coil spring overlying the post and captured between the second structure bore shoulder and the post shoulder;

a spherical washer overlying the post, the spherical washer having a flat surface contacting the exterior surface of the second structure, and a spherical surface oppositely disposed to the flat surface; and a spherical nut threaded onto the threaded end of the post with a spherical region of the spherical nut facing and contacting the spherical surface of the spherical washer.

7. The optical device of claim 6, wherein the support further comprises:

two parallel inwardly facing, spaced apart, parallel slot walls on the second structure, the slot walls defining an inwardly facing slot disposed such that the second structure bore shoulder forms a bottom of the slot and the post shoulder fits within the slot.

8. The optical device of claim 6, wherein the second structure comprises the optical housing.

9. The optical device of claim 6, wherein the first structure comprises the optical imager.

10. The optical device of claim 6, wherein the support comprises exactly three sets of posts, coil springs, spherical washers and spherical nuts.

11. The optical device of claim 10, wherein the three sets are positioned each at the vertices of a triangle.

* * * * *